United States Patent

Nakamura et al.

[11] 4,068,213
[45] Jan. 10, 1978

[54] CHECKOUT SYSTEM

[75] Inventors: Yasushi Nakamura, Oiso; Hirotomo Terada, Tokyo, both of Japan

[73] Assignee: NCR Corporation, Dayton, Ohio

[21] Appl. No.: 754,052

[22] Filed: Dec. 23, 1976

[51] Int. Cl.² .......................... H04Q 5/00; G06K 5/00
[52] U.S. Cl. ................................................ 340/149 A
[58] Field of Search ............... 340/152, 149 A, 147 A, 340/149 R; 235/61.7 B, 61.8

[56] References Cited

U.S. PATENT DOCUMENTS

| | | | |
|---|---|---|---|
| 3,559,175 | 1/1971 | Pomeroy | 340/152 |
| 3,719,927 | 3/1973 | Michels et al. | 340/149 R |
| 3,770,941 | 11/1973 | Gechele et al. | 340/149 R |
| 3,786,421 | 1/1974 | Wostl et al. | 340/147 A |
| 3,866,175 | 2/1975 | Seifert, Jr. et al. | 340/152 |
| 3,931,497 | 1/1976 | Gentile et al. | 235/61.7 B |
| 3,941,977 | 3/1976 | Voss et al. | 235/61.7 B |
| 3,956,615 | 5/1976 | Anderson et al. | 235/61.7 B |

Primary Examiner—Donald J. Yusko
Attorney, Agent, or Firm—J. T. Cavender; Wilbert Hawk, Jr.; Richard W. Lavin

[57] ABSTRACT

A merchandise checkout system is disclosed including a credit card reader operated by the customer to obtain credit information used in totalizing the merchandise transaction. A data terminal is utilized by the checkout operator to total the amount of the purchased items. Simultaneously with the operation of the data terminal, the customer operates the credit card reader to read a credit card inserted into the card reader by the customer and on which is magnetically encoded the amount of money, i.e. balance of account, available for use by the customer. If the amount available is greater than the total amount of the purchased items, the total amount is subtracted from the available amount with the result displayed and printed on the receipt and journal records of the data terminal as the amount paid. If the available amount is less than the total amount of the purchased items, the amount available is subtracted from such total of purchased items and the difference displayed as the amount due which is to be paid by the customer to complete the transaction.

8 Claims, 6 Drawing Figures

CHECKOUT SYSTEM

BACKGROUND OF THE INVENTION

The present invention relates to a merchandise checkout system in which an electronic cash register or terminal device is used in conjunction with a credit card reader to increase the speed of the checkout operation. The use of credit cards, either in the form of small plastic cards, plates or the like has become so widespread in merchandise transactions that the checking of credit authorization through use of the credit card is a standard part of today's merchandising checkout operation. Most prior art credit card systems store credit information at a central data station. In response to the submission of an account number from a remote credit reader, the system provides information relating to the account. For instance, the system may indicate that the credit card has been stolen, has expired, whether the account has been overdrawn or may indicate the dollar amount of available credit. One system magnetically imprints a dollar amount on the credit card that may be spent during a predetermined length of time. After a sales transaction is completed, the system subtracts the amount of the transaction from the available balance and rewrites the new balance on the card. Other systems will simply store the new balance at the central station. Common to all of these prior checkout systems which include a terminal device and a credit card reader is the requirement for the operator to operate the credit card reader after totalling the merchandise to check if the customer is authorized to use the credit card in paying for the merchandise purchased. This requires the customer to give the credit card to the operator with the operator then inserting the card in the card reader orientated in a predetermined position to provide a valid read operation. Such requirement measurably increases the time of the checkout operation in addition to complicating the checkout routine of the operator, the latter tending to increase operator errors during the checking of the merchandise at peak hours. Prior art arrangements have also been directed to systems for identifying the owner of the card or to provide a visible indication that the credit card is valid and may be used in paying for the merchandise purchased. In all cases, the operator is again required to perform the card reading operation. It is therefore a primary object of this invention to provide a merchandise checkout system capable of executing a checkout operation which includes a credit authorization procedure in the minimum amount of time. It is a further object of this invention to provide a checkout system which includes a terminal device and credit card reader, both of which are operated simultaneously by the checkout operator and the customer respectfully. It is another object of this invention to provide a checkout system in which the amount read from the credit card is entered into the data terminal and used to prepare the customer's receipt showing the amount paid and, in case of a credit balance less than the total of the merchandise amount, the money amount due from the customer to complete the sales transaction.

SUMMARY OF THE INVENTION

In order to carry out these objects, there is provided a checkout system which includes a data terminal device, a card reader and a data processing unit for controlling the operation of the terminal and the reader to allow simultaneous operation of each during the checkout operation. The system contemplates the use of an identification card in the form of a credit card issued by a bank for each of its customers and on which is encoded an identification number and the amount of money available to the customer for use in purchasing merchandise items. The data terminal device is utilized by the operator to check out the items purchased by the customer. The card reader is utilized by the customer to read an identification number encoded on the card in checking the identity of the customer, the amount of money available for merchandise purchase and other necessary data for checking the validity of the card. This data is transmitted automatically to the data processing unit. A keyboard on the card reader is also utilized by the customer to insert a secret identification number which is compared by the data processing unit with the identification number read from the card which will match if the customer is the true owner of the card. If the card is valid, the amount of money available is automatically entered into the data terminal device as the amount against which the amount due for the purchased merchandise item is to be applied. If the available amount is not equal to the amount due, the data terminal device displays the difference between the amount available and the amount due which is required to be paid by the customer to complete the transaction. A receipt record showing details of the transaction is printed and issued to the customer. At the same time the available amount status of the credit card is caused to be updated to reflect the present sales transaction. The inputting of the data read by the data read by the card reader to the data processing unit is controlled by a priority interrupt unit which allows for the simultaneous operation of the card reader and the terminal device.

The invention will be better understood from the following detailed description of one preferred embodiment thereof with reference to the accompanying drawings.

DESCRIPTION OF THE PREFERRED EMBODIMENT

Figure 2:
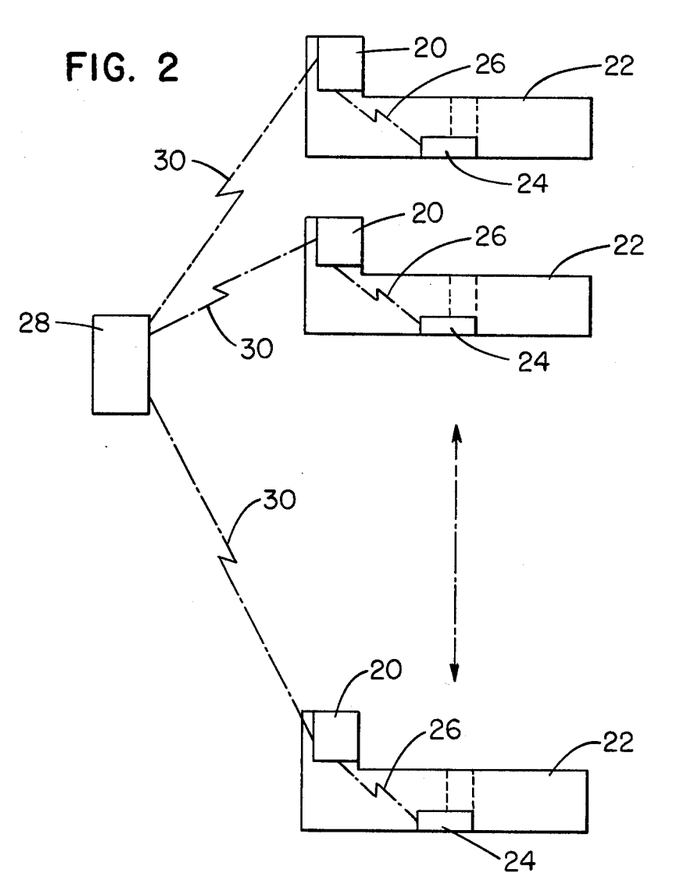
FIG. 2 is a schematic representation of the checkout system constructed in accordance with the present invention.

Referring now to FIG. 2, there is shown a plan view of the checkout system in accordance with the invention which includes a plurality of data terminal devices 20 which may be of the type shown and described in U.S. Pat. No. 3,866,175, issued Feb. 11, 1975 to Lloyd R. Seifert, Jr. and Joel H. Hinrichs, Jr., and which is assigned to the assignee of the present application. This patent is incorporated herein by reference. The terminal device 20 is mounted at the front portion of a checkout counter 22 within which is located a credit card reader 24 which is positioned so as to be accessible to the customer for operation thereby when he or she is standing next to the counter 22. The card reader 24 is connected to the data terminal device 20 by means of electrical cable 26 with each of the terminal devices 20 being connected to a store controller 28 by means of an electrical cable 30. As fully disclosed in the above Seifert et al., U.S. Pat. No. 3,866,175, the store controller 28 includes a central processing unit for processing the data received from a plurality of I/O devices which may include the terminal devices 20 and the credit card readers 24 of the present embodiment. The present checkout system will be described in connection with the use of an NCR 255 data terminal device and an NCR 726 store controller, the structure and function of each being fully disclosed in manuals and other texts published by the NCR Corporation, of Dayton, Ohio. Included in these publications, which are also incorporated herein by reference, are manuals (RM-0272) directed to the NCR 255/726 system, (MS-00264) concerning the 255 terminal, and (MS-00266) concerning the 726 controller. The card reader 24 may be of the type disclosed in the copending application of Diane P. Kerkhoff, Ser. No. 563,436, filed Mar. 31, 1975 and which was allowed in June 22, 1976, now U.S. Pat. No. 3,996,450. This application is assigned to the assignee of the present application and is further incorporated herein by reference. Data inputted into the controller 28 from the I/O devices is appropriately assembled, processed and then outputted to the I/O devices for display, printing, etc. In the checkout system of the present embodiment, the processed data from the controller 28 will be transmitted to the terminal device 20 for printing on both a receipt and a journal record, the processed data including data received from the terminal device 20 and the credit card reader 24.

Figure 3:
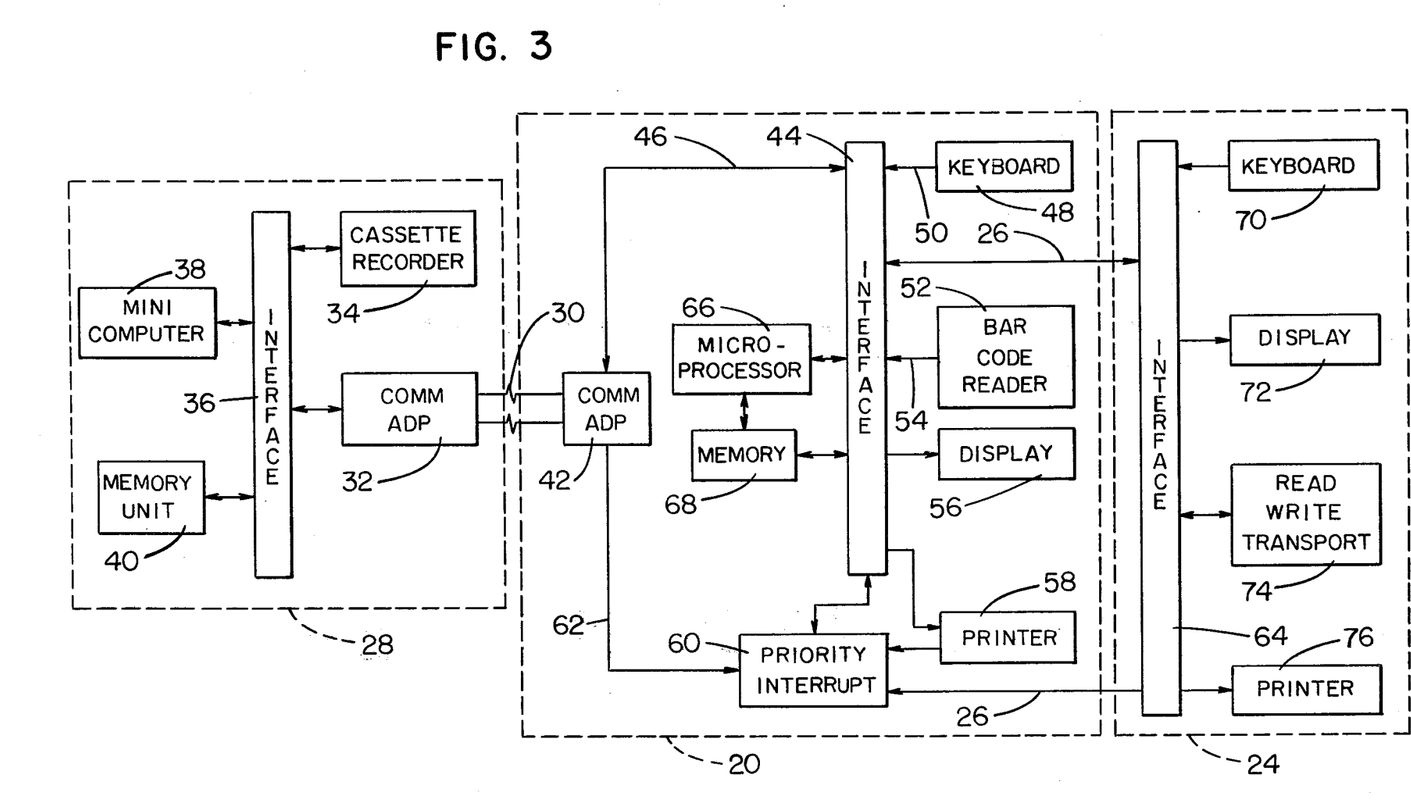
FIG. 3 is a functional block diagram of the checkout system in accordance with the present invention.

Referring now to FIG. 3, there is shown a functional block diagram of each of the devices which are included in the present checkout system. Included within the store controller 28 is a communication adapter 32 for controlling the transmission of data between an I/O device and the controller, — the I/O device being the data terminal 20 in the present application — a cassette tape recorder 34 for recording and storing data of each sales transaction on magnetic tape, an interface unit 36 connected to the communication adapter 32 and the recorder 34, a minicomputer 38 and a memory unit 40, both connected to the interface unit 36. The communication adapter 32 in the controller 28 is connected over the cable 30 to a communication adapter 42 located in one of the data terminal devices 20. As disclosed fully in the Seifert et al., U.S. Pat. No. 3,866,175, there is one communication adapter 32 in the controller 28 for each data terminal device 20. Also included in the data terminal device 20 is an interface unit 44 connected to the communication adapter 42 over line 46, a keyboard 48 for inputting merchandise data to the interface 44 over line 50, a bar code reader 52 which reads data from coded information located on the merchandise item concerning the merchandise item, — the reader 52 inputting the data read into the interface 44 over line 54 —, a display device 56 for displaying information processed in the controller 28 and a printer unit 58 for receiving and printing on the customer's receipt and the journal record information concerning the sales transaction such as the price of each item sold, the total amount of the sales transaction, the amount tendered for payment of the sales transaction, the amount due from the customer to complete the sales transaction and any other information that is deemed necessary for inclusion on the customer's receipt and the journal record.

Also included in the terminal device 20 is a priority interrupt unit 60 for controlling the timing of the processing of the input/output data transmitted between the controller 28, the terminal device 20 and the credit card reader 24 attached to the terminal device over cable 26 (FIG. 2). As shown in FIG. 3, the priority interrupt unit 60 receives data over line 62 from the communication adapter 42 which in turn receives the data from the controller 28. Data is also received by the interrupt unit 60 from the printer unit 58 and from an interface unit 64 over the cable 26 located in the credit card reader 24. Data read from a credit card inserted into the card reader 24 by the customer will be transmitted to the terminal device 20 under the control of the priority interrupt circuit unit 60. The interface unit 44 in the data terminal device 20 is also connected to the interface unit 64 in the credit card reader 24 over the cable 26 for transmitting data between the terminal device 20 and the card reader 24.

Also included in the data terminal device 20 is a microprocessor 66 and an associated memory unit 68 for processing data entered into the terminal device 20 from the credit card reader 24 in the situation where the terminal device 20 operates independently of, i.e. off-line from, the controller 28. In the present embodiment, it is assumed that the minicomputer 38 in the controller 28 provides the data processing functions of the present checkout system with the microprocessor 66 of the terminal device 20 controlling the flow of data between the terminal device 20 and the card reader 24 in addition to checking the identification of the customer as will be described more fully hereinafter. In any case, it is obvious that the microprocessor 66 of the terminal device 20 can be used to provide all the processing functions of the checkout system performed by the minicomputer 38 that will be described hereinafter if the checkout operation is limited to a stand alone terminal operation. It is also obvious, as disclosed in the Seifert et al., U.S. Pat. No. 3,866,175, that the checkout system disclosed herein will operate utilizing only the minicomputer 38 for the processing operation.

Figure 6:
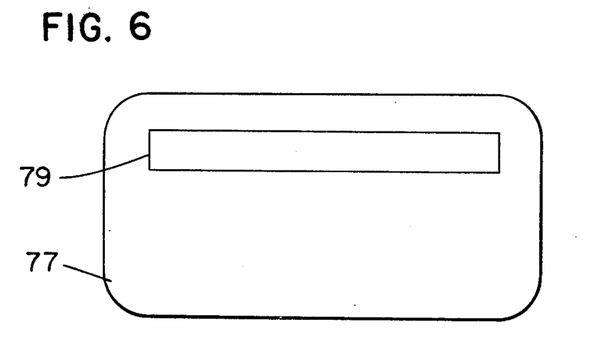
FIG. 6 is a back view of a typical customer's identification card.

The credit card reader 24 (FIG. 3) includes, in addition to the interface 64, a security check keyboard 70 for use in checking the identification of the credit card holder, an input display device 72 for displaying information concerning the operation of the card reader and the secret identification number of the customer, a read/write transport 74 for magnetically reading data from the credit card and for writing new data onto the card and a printer 76 for printing information from the credit card on a record member during the operation of the credit card reader. As shown in FIG. 6, the identification or credit card 77 utilized by the customer in the present embodiment may include at least one stripe of magnetic material 79 located therein. The magnetic stripe may consist of one or more tracks of prerecorded information or data which may include date of expiration, account number, bank number and a secret identification number. The customer is informed of the secret number and is told to remember it. As described more fully hereinafter, when the customer inserts the credit card into the card reader 24, the assigned secret number must be entered into the keyboard 70 of the card reader. If a predetermined relationship exists between the secret number read from the customer's credit card and the secret number entered by the customer and other conditions are met, the display 56 will be operated to display the validity of the credit card for use in the sales transaction.

Figure 4:
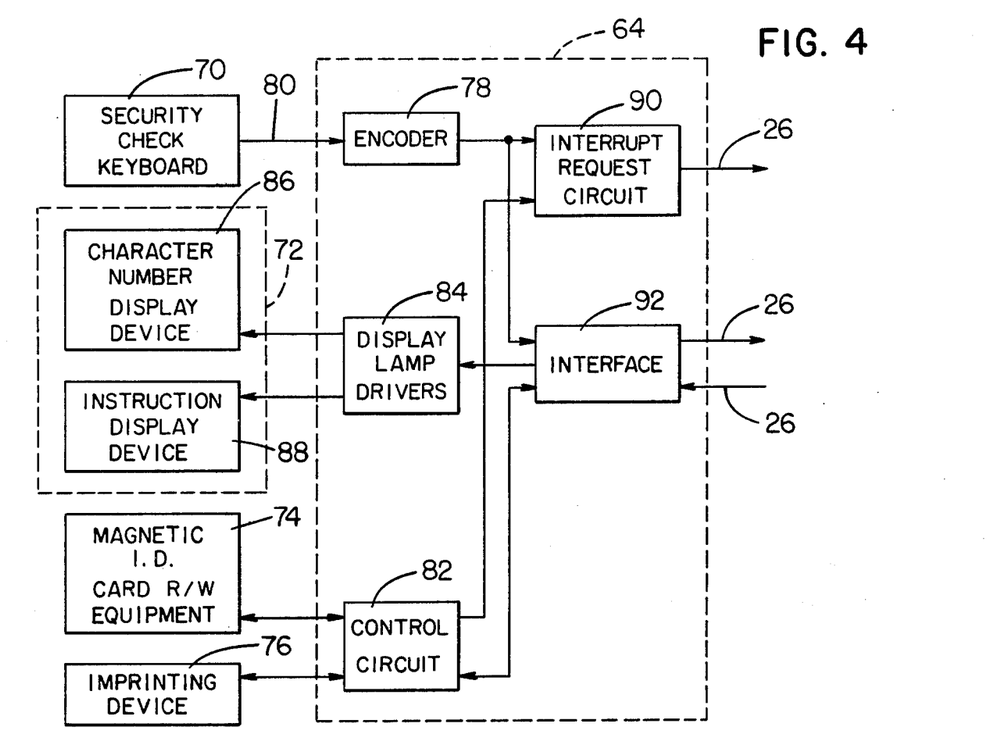
FIG. 4 is a functional block diagram of the credit card reader used in the checkout system shown in FIG. 2.

Referring to FIG. 4, there is shown a functional block diagram of the interface unit 64 of the credit card reader 24 together with details of the display device 72 and the keyboard 70. Included in the unit 64 is an encoder 78 connected over line 80 to the security check keyboard 70 for encoding in binary form a secret identification number inserted by the customer into the keyboard 70, a control circuit unit 82 for controlling the operation of the read/write transport 74 and the printer 76, lamp drivers 84 for operating lamps on a character number display device 86 and an instruction display device 88, each device being part of the display 72 (FIG. 3), an interrupt request circuit 90 and an interface unit 92. As seen in FIG. 4, the interface unit 92 is interconnected with the encoder 78, the lamp drivers 84 and the control circuit 82 while the interrupt request circuit 90 is connected to the encoder 78 and the control circuit 82. The functional relationship of each of the elements found in FIG. 4 will be described more fully hereinafter with respect to the flow diagram of FIG. 1.

Figure 5:
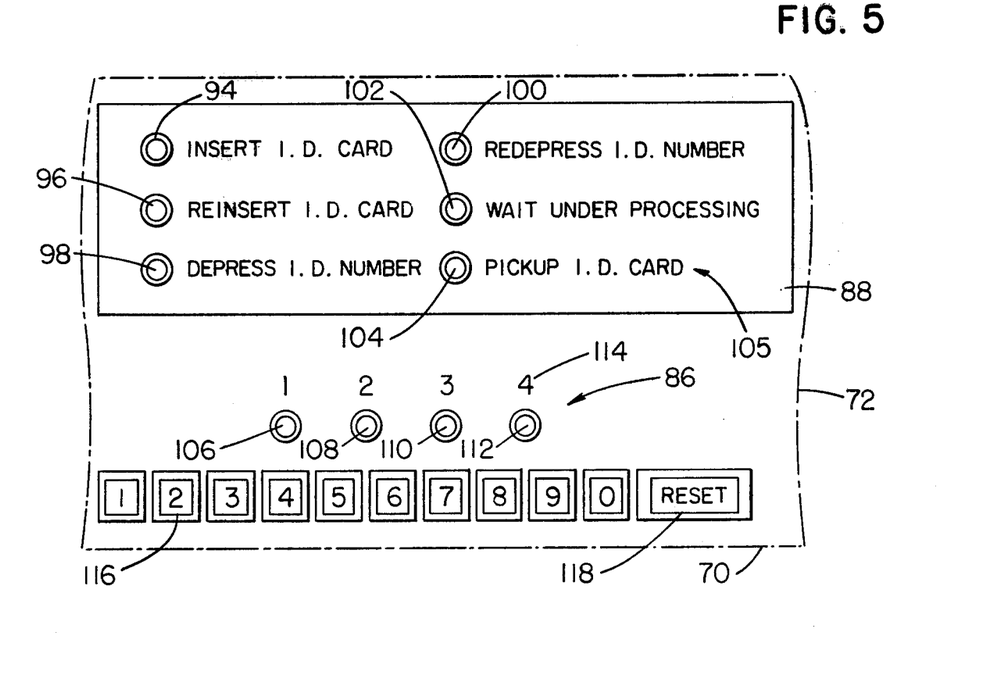
FIG. 5 is a plan view of the keyboard of the credit card reader.

Referring now to FIG. 5, there is shown a plan view of the keyboard of the credit card reader 24 which includes the security check keyboard 70 and the display 72 (FIGS. 3 and 4). Included in the display device 72 is an instruction display device 88 (FIGS. 4 and 5) comprising a plurality of indicating lamps 94, 96, 98, 100, 102 and 104, together with appropriate legends indicated by the numeral 105 for instructing the customer on the sequence of operation to be performed on the card reader 24. It can be seen from FIG. 5 that lamps 94, 98, 102 and 104 will provide the normal operation of the card reader 24 in which the secret identification number is introduced into the checkout system by the customer for use in checking the validity of the identification or credit card 77 (FIG. 6). Lamps 96 and 100 indicate a failure of the previous operation and to initiate a new card reading operation. Also included in the card reader 24 are a plurality of character number display lamps 106, 108, 110 and 112, with appropriate numerical indicia 1-4, inclusive, located thereabove (at 114) for indicating the number designation of each character in the secret identification number as they are inserted into the security check keyboard 70 by the customer. The number of lamps can of course be expanded to accommodate larger number designations. Below the display 72 on the card reader 24 are a plurality of numerical keys 116 comprising the security check keyboard 70 for use by the customer to manually insert the customer's identification number and a reset key 118 for resetting the keys 116 if a mistake in entry has been made by the customer.

Figure 1:
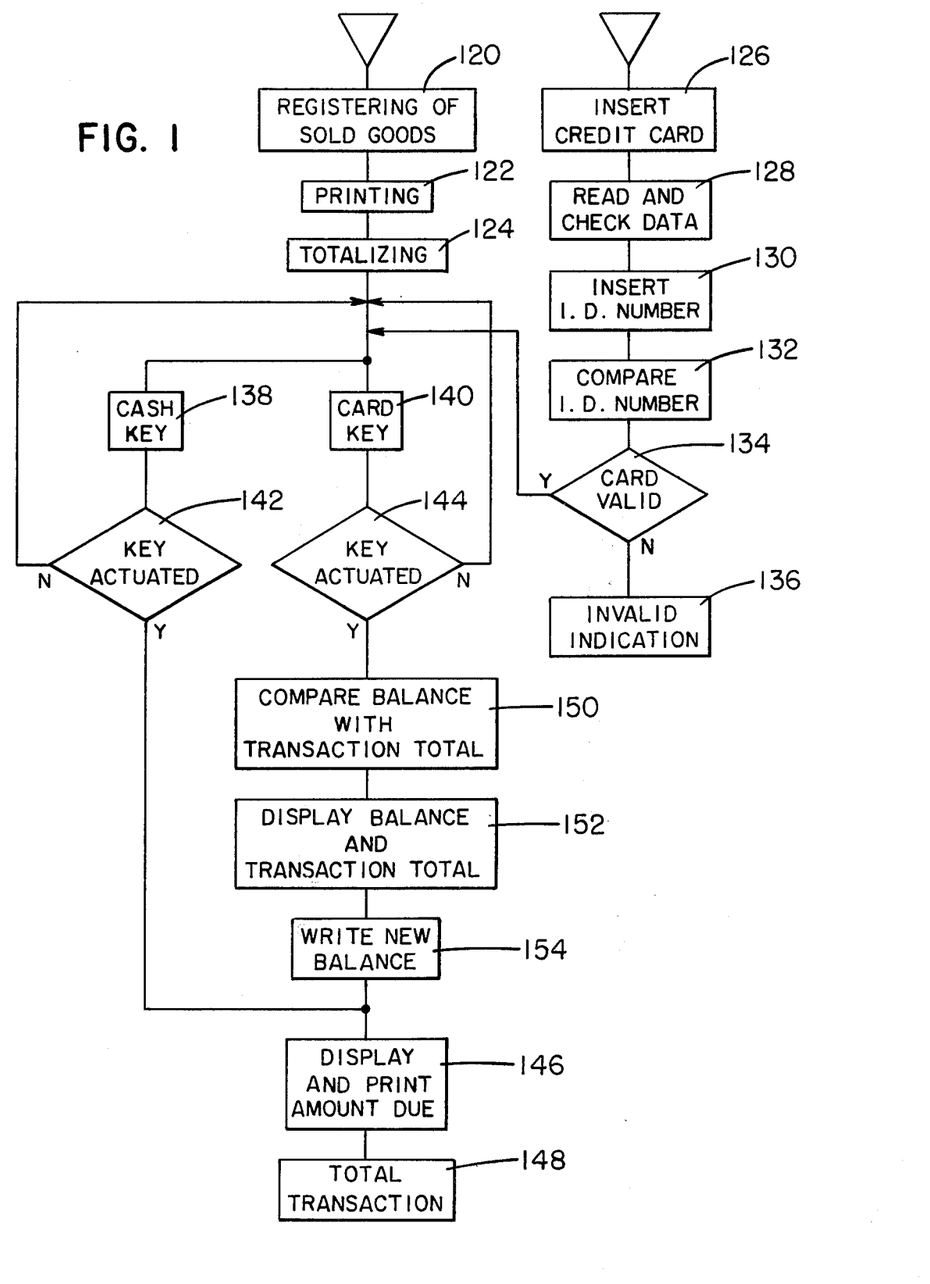
FIG. 1 is a flow chart operation of the checkout system in accordance with the present invention.

Referring now to FIG. 1, there is shown a flow diagram of the operation of the checkout system according to the present invention. Upon delivery of the purchased merchandise items to the checkout counter 22 (FIG. 2), the operator will check out each item by indexing (block 120) the price of the item together with a department identification code and any other data that may be associated with the item being purchased into the keyboard 48 (FIG. 3) of the data terminal device 20 in a manner that is well known in the art. As fully disclosed in the Seifert et al. U.S. Pat. No. 3,866,175, data entered into the keyboard 48 of the terminal device 20 is transmitted through the interface 44 (FIG. 3), the communication adapter 42 and over cable 30 to the minicomputer 38 in the controller 28 for processing and storage. The minicomputer 38 will generate a return message which operates the printer 58 in the terminal device 20 to print on the receipt and the journal (block 122) the data as entered into the keyboard 48. This operation will continue until all the merchandise items being purchased are registered through the keyboard 48 and a total operation (block 124) of the items being purchased is completed and printed.

If the customer intends to purchase the merchandise items with the use of a credit card 77 (FIG. 6), he or she will insert the credit card (block 126) into the credit card reader 24 at the same time the operator is checking out through the keyboard 48 the items being purchased. While the credit card of the present embodiment is of the type in which the amount available for use, i.e. balance of account, is magnetically encoded on the card 77 (FIG. 6), it is obvious that other types of credit cards may be used where the available amount is stored in the minicomputer portion of the controller 28 and outputted to the data terminal device 20 when required. The function of the credit card reader 24 is to read the amount on the credit card 77 that is available for use by the customer in purchasing merchandise items, to write the new balance of the amount available after the total of each sales transaction has been subtracted from the previous balance or available amount, and to provide data which is used in checking the validity of the credit card presented by the customer.

Upon the customer's insertion of the credit card 77 (FIG. 6) within the card reader 24, the read/write transport 74 (FIG. 3) will be operated to read from the magnetic stripe 79 (FIG. 6) an identification number, the available balance, and any other information that may be required (block 128—FIG. 1). As illustrated in FIG. 4, the data read from the credit card by the read-write transport 74 is transmitted through the control circuit 82 located in the interface unit 64 of the card reader 24 (FIG. 3.). Such unit 64, upon receiving this data, will control the interrupt request circuit 90 (FIG. 4) causing the priority interrupt unit 60 of the data terminal 20 (FIG. 3) to send an interrupt signal through interface 44 to the microprocessor 66 and thereby interrupt the operation of the microprocessor 66 in the terminal 20 so that it may receive a certain portion of the credit card contained data. In the present application, the microprocessor 66 will be utilized to check the identification number of the customer (as input by customer through keyboard of credit card reader and as read by credit card reader from customer inserted credit card) although it is obvious that the minicomputer 38 in the store controller 29 could also be utilized in the same manner if so desired. Thus, the microprocessor 66 will receive the identification number portion of the credit card 77 data while the remaining data from such card is transmitted to the minicomputer 38 in the store controller 28. The minicomputer 38 upon receiving this remaining data will store the available amount balance and utilizes the rest of the data to check the validity of the credit card. This may include determining whether the card is stolen, whether the account is overdrawn, or other desired determinations indicating card misuse. All functional operations of the terminal device 20 and the credit card reader 24 are controlled by programs stored in the minicomputer 38.

As fully disclosed in the previously-cited Seifert et al., U.S. Pat. No. 3,866,175 and in the Class 255 NCR Manual (MS-00264), the terminal device display 56 (FIG. 3) includes a plurality of instructions pertaining to the operation of the terminal device 20, which display 56 is similar to the instruction display device 88 of the card reader 24. The illumination of these instructons in both the display 56 and the display 88 is controlled by the minicomputer 38 in a predetermined sequence to provide a step-by-step checkout operation.

At the start of the checkout operation, the lamp 94 (FIG. 5) in the instruction display device 88 will be illuminated to instruct the customer to insert the credit card within the card reader 124. After the insertion of the credit card 77 (FIG. 16) and with the receiving of the data so read by the card reader, the minicomputer 38 will cause the lamp 98 to light instructing the customer to index the appropriate numerical keys 116 in the keyboard 70 (FIG. 5 and block 130 of FIG. 1) to enter his or her secret identification number in the manner disclosed in the previously-cited co-pending Kerkhoff application, Ser. No. 563,436, now U.S. Pat. No. 3,906,450. Indexing of the card reader keys 116 by the customer results in each numerical character of the identification number being outputted over line 80 to the encoder 78 (FIG. 4) which converts the identification character into a 4 bit binary word. This binary word is then transmitted through interface 92 and over line 26 through interface 44 to miroprocessor 66 under the control of the priority interrupt 60 in the same manner as the data read by the read/write transport described above.

Upon receiving each numerical character of the secret identification number from the credit card reader 24, the microprocessor 66 will operate the display 72 of such reader 24 through the lamp drivers 84 (FIG. 4) to display the entered numerical character by utilizing lamps 106, 108, 110 and 112 of the character number display 86 (FIG. 5) and to light lamp 102 (FIG. 5) in the instruction display device 88 indicating that the processing of the data is occurring. If the customer inadvertently depresses the wrong keys 116 when entering the identification number, the operation can be repeated by depressing the reset 118 (FIG. 5) and repeating the keying in operation. The microprocessor 66 compares (block 132—FIG. 1) the identification number read from the credit card with the identification number inserted by the customer and outputs a signal to the minicomputer 38 indicating whether a match has occurred or not. The minicomputer 38 in the controller 28 checks the amount of the available balance and other data to determine (block 134) if the credit card is valid for use in the item transaction. In case a mismatch in the identification number is found or there is a determination that the card is invalid for use, the display 56 in the terminal device 20 (FIG. 3) will be operated by the minicomputer 38 to indicate such a condition requiring the terminal device to be operated by the operator in a cash sale mode in a manner to be described hereinafter.

Assuming that the credit card has been determined valid and that the secret identification number inserted into the card reader 24 by the customer coincides with the identification number read from the credit card by such reader, the display 56 in the terminal device 20 will display a legend indicating this condition existing to the checkout operator. The checkout operator, in response to such condition, will then arcuate one of two transaction mode keys located in the keyboard 48 of the terminal device 20 — either a cash key (block 138—FIG. 1) requiring the presentation of cash to complete the sales transaction or a card key (block 140—FIG. 1) indicating a credit sales operation. The system checks the state of actuation of the cash key (block 142) and of the card key (block 144) to see if either key has been depressed. Upon sensing that the cash key 138 has been depressed, the system will display and print out on the receipt and journal record (block 146—FIG. 1) the total of the sales transaction which is equal to the money amount due. Upon receiving the amount due from the customer, the system then totals the transaction (block 148). If the card key 140 has been depressed by the operator, the data read from the credit card representing the balance of the amount available for use as credit will be checked by the minicomputer 38. The present application is directed to such an amount balance magnetically written on the credit card and which is available for use within a definite period of time, for instance, one month. The limit available is determined according to the credit rating, bank deposit or other commercial considerations of the customer that may exist. The available amount or limit of purchase is written magnetically on the credit card in a manner well known in the art effective as of a specified time, example — beginning of a moth, or at the time of the first sale transaction in the month. Subsequent sale transactions will each reduce the balance of the available amount according to the amount being purchased. The current available balance comprises a portion of the data read by the credit card reader 24 upon insertion of the credit card into the reader and which balance was transmitted to the minicomputer 38 for use as part of the sales transaction as described previously. Upon the system sensing the actuation of the card key 140, the current available balance is compared (block 150-FIG. 1) with the total amount due on the sales transaction. Both the credit card available balance and the total amount of the sale are then displayed (block 152) on the display 56 (FIG. 3) of the terminal device 20. The total amount of the sale is subtracted from the available balance of the customer (block 154), generating a new or current available balance which is written on the credit card by the read/write transport 74 of the card reader 24. If the total amount of the sale is greater than the credit card balance, the difference between the two amounts will be displayed (block 146) on the terminal device display 56 (FIG. 3) as the amount due from the customer to complete the present sales transaction. In this instance the current available balance generated and caused to be written by the read/write transport 74 on the credit card will be zero. In a similar manner, if the available balance on the credit card is greater than the total amount of the present sale, the amount due from the customer will be indicated on display 56 as zero. After receiving the amount due from the customer when it is required, the sales transaction is completed (block 148—FIG. 1) by totalizing the operation, printing the data on the receipt and journal and transmitting the data to the store controller 28 for further processing that may be required in completing the sales transaction — which may include recording the data of the sale on the cassette recorder 34 for the permanent storing thereof. The credit card is then ejected from the card reader 24 for return to the customer and end the operation.

While there have been shown and described embodiments of a checkout system utilizing a credit card as payment for a sales transaction, it is obvious that many modifications and improvements can be made within the scope of this invention, such, for example, as the use of an on-line system with an account located in a remote bank for the credit source. Other modification may include having the selection of a card or cash operation controlled solely by operation of the minicomputer or other data processing operations. These modifications and improvements are intended to be covered by the following claims.

What is claimed is:

1. A system adapted for use in a checkout operation to check out merchandise items purchased by a customer, comprising:
   a. an identification means having recorded thereon an available balance for use by the customer;
   b. means operative by the customer for reading the available balance on the identification means and outputting signals representative of said available balance;
   c. a data input device operated by a checkout operator simultaneously with the operation of said reading means for receiving data representing the amount of each item purchased during a sales transaction and totaling the amount of the sales transaction;
   d. means operatively interconnecting said input device and said reading means and responsive to said signals to effectively transfer the available balance to said input device;
   e. means for comparing the available balance with respect to the total amount of the sales transaction;
   f. and means for indicating the difference between the total amount of the sales transaction and the available balance on the identification means.

2. A system as set forth in claim 1 which further includes a checkout counter for use in checking out the merchandise items purchased by the customer, said data input device and said reading means being mounted adjacent said counter and separated from each other to allow the operation of the input device by a checkout operator and the reading means by the customer to occur simultaneously.

3. A system as set forth in claim 2 in which said data input device comprises a terminal device having a first and a second transaction mode key for indicating the use of cash or the available balance, respectively, as payment for the total amount of the items purchased by the customer, said second transaction mode key being operated in response to the operation of said indicating means to allow the available balance to be applied by said applying means to the total amount of the items purchased.

4. A system for checking out merchandise items purchased by a customer in which an identification card having an available amount recorded thereon is applied as payment for the purchased merchandise items whose total amount exceeds the available balance, comprising:
   a. a terminal device positioned on a checkout counter and operated by a checkout operator to enter the amounts of the items being purchased and totaling the amounts of the transaction;
   b. data reading means mounted adjacent the terminal device on the checkout counter and operated by the customer for reading the amount balance available for use by the customer and an identification number from a customer's identification card;
   c. means located on said data reading means and manually operable by the customer to enter a secret identification number into the system;
   d. means for comparing said secret identification number and said identification number to see if they match;
   e. means located in said terminal device for displaying a signal representing the matching of said identification and secret identification numbers;
   f. transaction key means located in said terminal device and operable by the checkout operator in response to the displaying of said signal to indicate the matching of the identification and secret identification numbers;
   g. computer means connected to said terminal device and said data reading means for receiving data therefrom and operable in response to the operation of said transaction key means to reduce the total amount of the transaction by the amount balance available to the customer;
   h. and means responsive to operation of said computer means to display the difference between the transaction total amount and the available amount balance, which difference is to be paid by the customer to complete the transaction.

5. The system of claim 4 further comprising means mounted on said data reading means for displaying the secret identification number to the customer during the entering of the secret identification number into the system to allow the customer to verify the accuracy of the secret identification number being entered into the system.

6. In a system adapted to check out merchandise items purchased by a customer in which an identification card having an available amount recorded thereon is applied as payment for the purchased merchandise items whose total amount exceeds the available balance, the combination comprising:
   a. a checkout counter;
   b. an identification card having recorded thereon an identification number and an available balance for use by the customer in paying for the items purchased;
   c. a card reader mounted on said checkout counter and operated by the customer for reading the identification number and the available balance on the identification card;
   d. a data input terminal device mounted on said checkout counter adjacent said card reader and operated by a checkout operator simultaneously with the operation of said card reader for inputting data representing the amount of each item purchased;
   e. display means;
   f. keyboard means located in said card reader and operated by the customer to enter into said reading means a secret identification number;
   g. computer means connected to said input terminal to receive the amount of each item purchased and to total the amount of the purchased items;
   h. interrupt means interconnecting said card reader and said computer means to interrupt the operation of the computer means to transfer the identification number and the secret identification number to the computer means for comparison thereby, said computer means operating said display means to indicate a matching of said numbers;

i. a transaction key member mounted in said data input terminal device and operable by the checkout operator in response to the indication of the matching of said identification numbers;

k. and means interconnecting said transaction key member and the computer means to allow the computer means to sense the operation of said transaction key member, said computer means subtracting the available amount from the total amount of the purchased items in response to the operation of said transaction key member and operating said display means to display the difference between the amount available and the total amount of the purchased items.

7. A system for processing the checking out of merchandise items purchased by a customer comprising:

a. a checkout counter;

b. card receiving means mounted on said checkout counter including means for receiving a credit card, means for reading and writing identifying indicia on the credit card including a customer identification number and an available balance, first keyboard means operated by the customer for inputting a customer's secret identification number into the card receiving means, first display means for displaying the customer's secret identification number inputted into the card receiving means by the customer on the first keyboard means, first printer means for printing data generated by said keyboard means and said reading and writing means and first interface means connected to said first keyboard means, reading and writing means, and said first display means for receiving and transmitting data thereto;

c. a data input means mounted adjacent said card receiving means on said checkout cunter and operated by a checkout operator simultaneously with the operation of said card receiving means, said data input means including a second keyboard means for inputting data representing the amount of each item purchased by the customer during a sales transaction, second display means for displaying information connected with the customer's sales transaction, second printing means for printing on a record member data representing the amount of the items purchased by the customer and second interface means connected to said first interface means, said second keyboard, second display and second printing means for receiving and transmitting data therebetween;

d. computer means connected to said second interface means to receive the amount of each item purchased and to total the amount of the purchased items;

e. interrupt means connected to said first interface means and said computer means to interrupt the operation of said computer means to transfer the identification number, the available amount read by said reading and writing means from said credit card and the secret identification number inputted into the first keyboard means by the customer to the computer for comparison thereby, said computer means operating said second display means to indicate a matching of the identification number and the secret identification numbers;

f. a transaction key member mounted in said second keyboard means and operated by said checkout operator in response to the displaying of the matching of said identification numbers in said second display means;

g. and communication means interconnecting said second interface means and said computer means to allow the computer means to sense the operation of said transaction key member, said computer means subtracting the available amount from the total amount of the purchase items in response to the operation of said transaction key member and operating said second display means to display the difference between the amount available and the total amount of the purchased items.

8. A method for checking out a plurality of merchandise items in which a credit card having an available balance is applied as payment for the merchandise items whose total amount exceeds the available balance comprising the steps of:

a. simultaneously totalizing the amount of the merchandise items purchased to obtain a total amount and reading from a credit card a customer identification number and the amount of money available for us in purchasing merchandise items;

b. comparing the identification number with a secret identification number obtained from the customer;

c. indicating when a match exists between the number;

d. subtracting the available amount from the total amount in response to the indication of the matching of the number;

e. and displaying the difference between the total amount and the available amount as the amount of money required to be paid by the customer.

* * * * *